No. 662,229. Patented Nov. 20, 1900.
J. EWART.
FIRE PUMP APPARATUS FOR BUILDINGS.
(Application filed Mar. 19, 1900.)

(No Model.) 2 Sheets—Sheet 1.

No. 662,229.  
J. EWART.  
FIRE PUMP APPARATUS FOR BUILDINGS.  
(Application filed Mar. 19, 1900.)  
(No Model.)  
Patented Nov. 20, 1900.  
2 Sheets—Sheet 2.

UNITED STATES PATENT OFFICE.

JOHN EWART, OF ARLINGTON, MASSACHUSETTS, ASSIGNOR OF ONE-FOURTH TO JOSEPH A. EWART, OF BRAINTREE, MASSACHUSETTS.

FIRE-PUMP APPARATUS FOR BUILDINGS.

SPECIFICATION forming part of Letters Patent No. 662,229, dated November 20, 1900.

Application filed March 19, 1900. Serial No. 9,237. (No model.)

*To all whom it may concern:*

Be it known that I, JOHN EWART, of Arlington, in the county of Middlesex and State of Massachusetts, have invented certain new and useful Improvements in Fire-Pump Apparatus for Buildings, of which the following is a specification.

This invention relates to sprinkling or fire-extinguishing apparatus to be applied to buildings for protection against fire, and it has for its object to provide such apparatus with means for automatically changing from a tank-supply to a water-main supply.

The invention consists of certain novel features of construction and arrangement hereinafter described and claimed.

Figure 1:
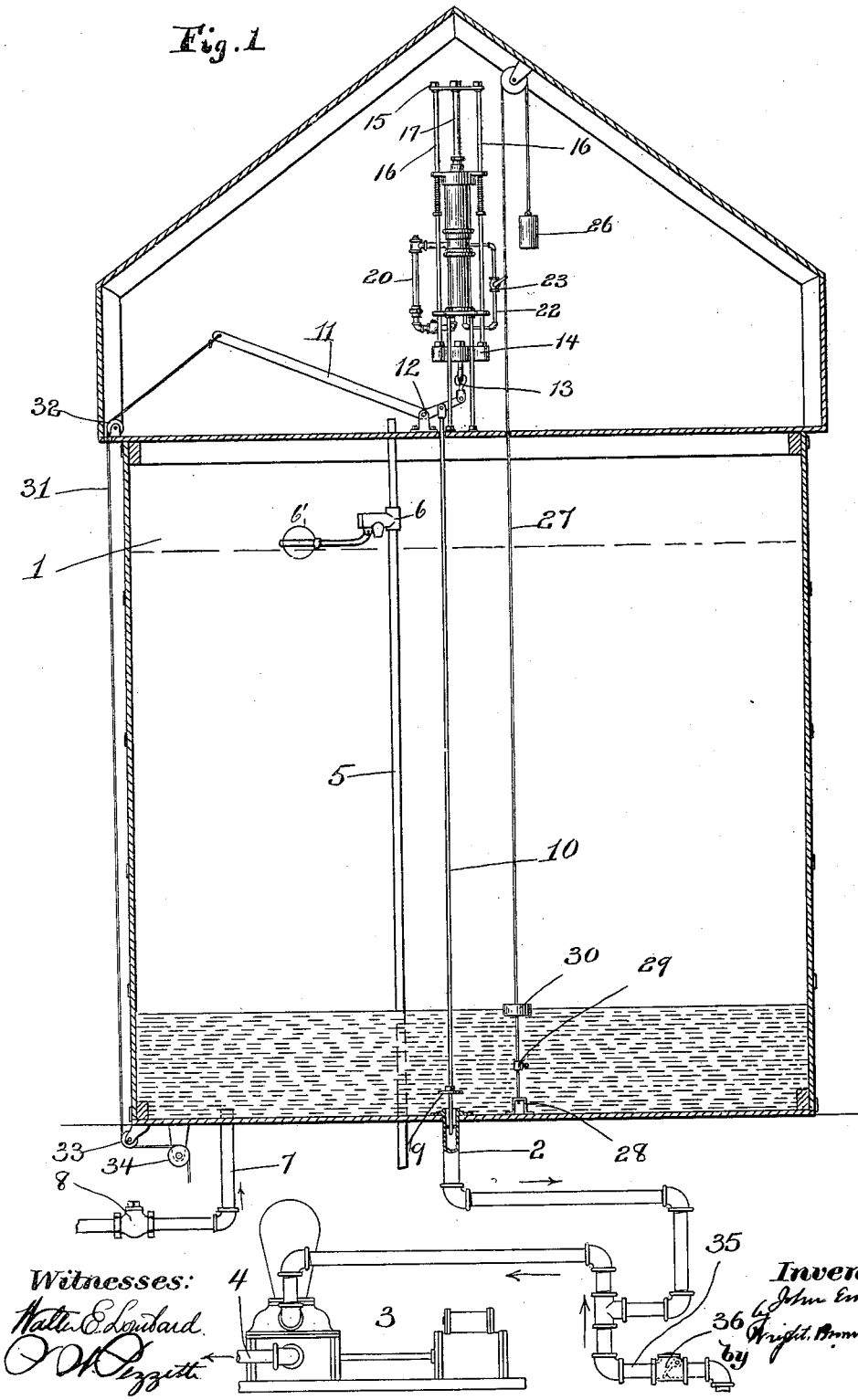
Figure 2:
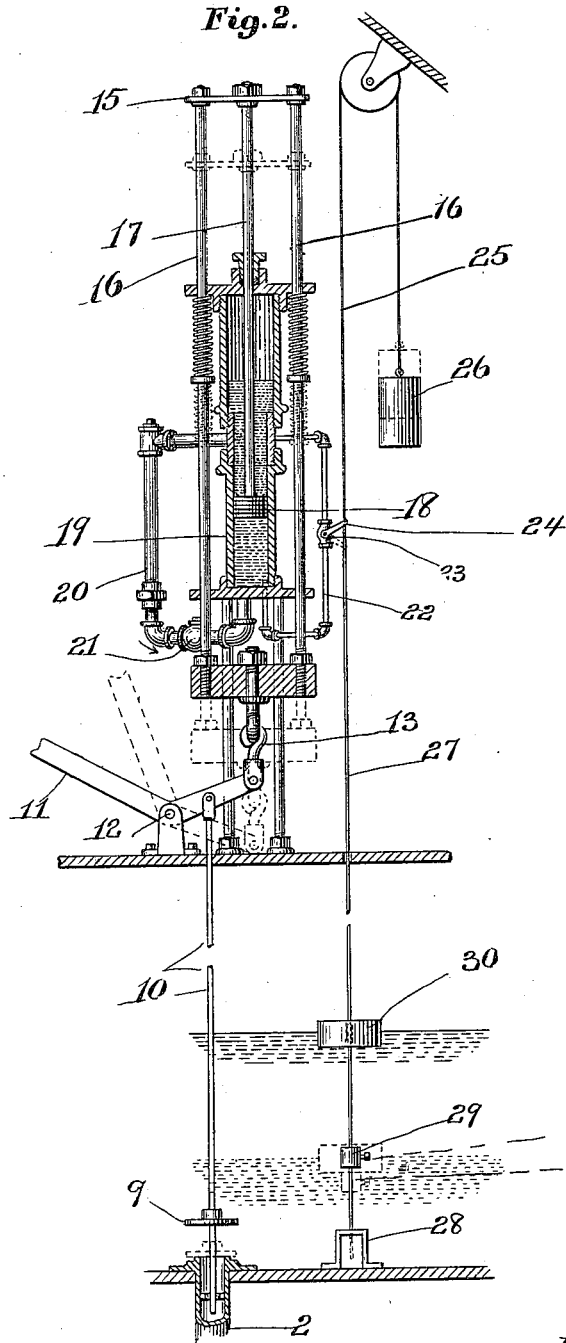

Of the accompanying drawings, Figure 1 represents a view in section and diagram showing an apparatus constructed in accordance with my invention. Fig. 2 represents an enlarged sectional view showing the mechanism for controlling the tank-valve.

Referring to the drawings, 1 designates a supply tank or reservoir adapted to be placed in an elevated position in or upon a building and provided with an outlet-pipe 2, delivering to a steam-pump 3, which has a delivery-pipe 4 connected with the sprinkling or fire-extinguishing system in the building. The tank 1 is kept normally full of water through a supply-pipe 5, whose delivery is automatically controlled by a float-valve 6, so as to maintain a constant level of water in the tank. Ordinarily the tank and sprinkler system are kept full of fresh water, which is supplied through the pipe 5 and is slowly circulated by the pump 3 through the system.

7 is a return-pipe leading from the sprinkler system to the tank 1 and containing a check-valve 8, which opens toward the tank. The orifice of the delivery-pipe 2 is controlled by a valve 9, mounted upon a stem 10, which is connected at its upper end to the short arm of a lever 11, pivoted at 12 to the upper casing of the tank. Said short arm of the lever is also connected by a link 13 with a yoke 14, to which a second yoke 15 is connected by suitable guide-rods 16 16. To the upper yoke 15 is attached a piston-rod 17, having at its lower end a piston 18, which operates within a cylinder 19. The guide-rods 16 are shown as surrounded by springs which assist the descent of the yokes and piston.

20 is a large by-pass pipe connecting the cylinder-space above the piston 18 with the cylinder-space below said piston and containing a check-valve 21, which opens toward the lower cylinder-space. Also connecting the upper and lower cylinder-spaces is a smaller by-pass pipe 22, having a valve 23, whereby the passage through it may be opened and closed. Said valve 23 is provided with an operating-lever 24, counterweighted by a cord 25 and weight 26 and connected to a depending rod 27, which passes downwardly into the tank 1. The lower end of the rod 27 is suitably guided in a bracket 28, and to said rod, near its lower end, is affixed an adjustable collar 29.

30 is a float loosely surrounding the rod 27 and adapted to slide up and down thereon as the level of the water in the tank changes, said float being of sufficient weight to depress the rod 27 when the water falls low enough to allow the float to rest upon the collar 29.

The spaces above and below the piston 18 within the cylinder 19 are occupied by a liquid, preferably non-freezable within ordinary ranges of temperature. Upward movement of the piston 18 is allowed to occur freely because of the by-pass 20 and the check-valve 21 opening toward the lower cylinder-space. When said piston moves upwardly, the liquid within the cylinder 19 is merely exchanged between the space above the piston and the space below the same, passing freely through the by-pass pipe 20. The long arm of the lever 11 has attached to it a cord 31, which passes over suitable guide-pulleys 32 33 34 to a point within reach of an attendant, and said cord may obviously be provided with an index to indicate the position of the piston 18, and hence of the tank-valve 9, at any time.

Connected to the pipe 2, which runs from the tank 1 to the pump 3, is a pipe 35, through which salt water may be supplied to the pump, said pipe containing a check-valve 36, which opens toward the pump.

The operation is as follows: The tank 1 is ordinarily filled with fresh water to a level predetermined by the float 6', and the valve 9 is set in an open position by the attendant raising the piston 18 through the lever 11 and operating-cord 31. With the float 30 elevated above the collar 29 the weight 26 will raise the outer end of the lever 24, controlling the pilot-valve 23 in the by-pass pipe 22, and will thereby close said valve and shut off the passage through said by-pass. The piston 18 and valve 9 are therefore held in an elevated position. Since the pump is ordinarily below the level of the tank 1 and above the level of the salt-water supply, it will not draw any water through the salt-water pipe 35 so long as the valve 9 is open, for the water in the tank will then tend to flow to the pump under a head, whereas the salt water has to be raised through the pipe 35. As hereinbefore stated, the pump is always kept moving slowly, and the fresh water is accordingly circulated from the tank 1 through the pump 3 and the sprinkling or fire extinguishing system and back to the tank through the pipe 7. When, however, the provision of an outlet through the sprinkling system creates a draft of water on the tank, as in case of fire, the return flow through pipe 7 ceases, and by suitable automatic means the movement of the pump is accelerated. The store of water in tank 1 then diminishes and may become exhausted to a point where the float 30 rests upon the collar 29. When this occurs, the rod 27 is depressed and the by-pass valve 23 opened, allowing the piston 18 to descend and cause the valve 9 to move against its seat and close the outlet from the tank through the pipe 2. Since the pump can no longer obtain water from the tank 1, it sucks the salt water up through the pipe 35 and pumps it through the sprinkling system.

My invention enables me to maintain a supply of fresh water in the tank and sprinkler system at all times during inaction of the system, and thereby prevent destruction of the sprinkler system by corrosion, which occurs when salt water is allowed to stand in the pipes. At the same time it places a supply of salt water automatically at the disposal of the pump in case of fire.

Having thus explained the nature of the invention and described a way of constructing and using the same, although without having attempted to set forth all of the forms in which it may be made or all of the modes of its use, I declare that what I claim is—

1. The combination of a supply-tank adapted to furnish water to a fire-extinguishing system, a pump connected with said tank and with the system, an independent source of water-supply connected with the pump, and means controlled by the water-level in the tank for automatically shifting the suction of the pump from the tank-supply to the independent supply.

2. The combination of a supply-tank adapted to furnish water to a fire-extinguishing system, and having an outlet, a valve controlling said outlet and controlled by the level of the water in the tank, said valve closing the outlet when the water is at a relatively low level, a pump delivering to the system and having its suction connected with said outlet, and an independent water-supply connected with the suction of the pump and adapted to be drawn upon automatically when said tank-valve closes.

3. The combination of a supply-tank adapted to furnish water to a fire-extinguishing system, and having an outlet, a main valve controlling said outlet, a manually-operated device adapted to open said valve, a liquid-controlled retarding device adapted to hold the valve in open position, a pilot-valve associated with said retarding device and adapted when open to permit the closing of the main valve, a float controlled by the level of the water in the tank and adapted to operate the pilot-valve, said float opening the pilot-valve when the water has sunk to a predetermined level, a pump delivering to the system and having its suction connected with said outlet, and an independent water-supply connected with the suction of the pump, and adapted to be drawn upon automatically when the main valve closes.

4. The combination of a supply-tank adapted to furnish water to a fire-extinguishing system, and having an outlet, a main valve controlling said outlet, a manually-operated device adapted to open said valve, a liquid-controlled retarding device adapted to hold the valve in open position, a pilot-valve associated with said retarding device and adapted when open to permit the closing of the main valve, a float controlled by the level of the water in the tank and adapted to operate the pilot-valve when the water has sunk to a predetermined level, adjusting means to vary the point at which said float acts, a pump delivering to the system and having its suction connected with said outlet, and an independent water-supply connected with the suction of the pump, and adapted to be drawn upon automatically when the main valve closes.

In testimony whereof I have affixed my signature in presence of two witnesses.

JOHN EWART.

Witnesses:
E. BATCHELDER,
A. D. HARRISON.